May 31, 1949.  W. L. HENDRICKS  2,471,524
ANTIGLARE REARVIEW MIRROR ATTACHMENT
Filed April 23, 1946
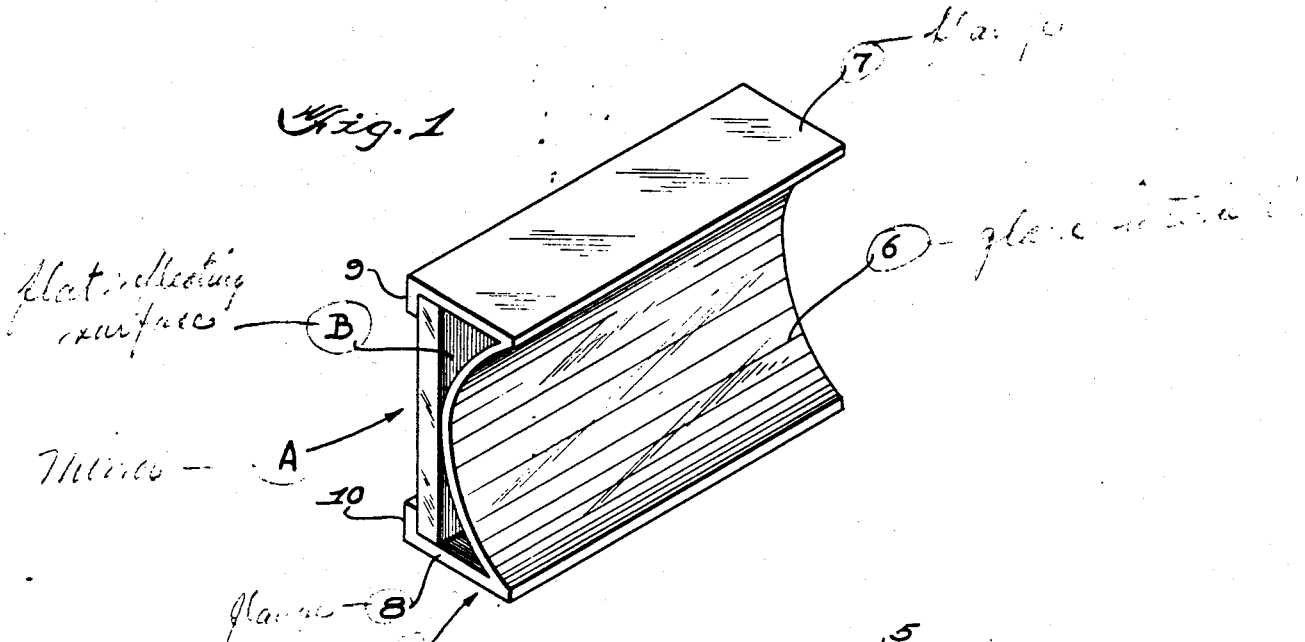
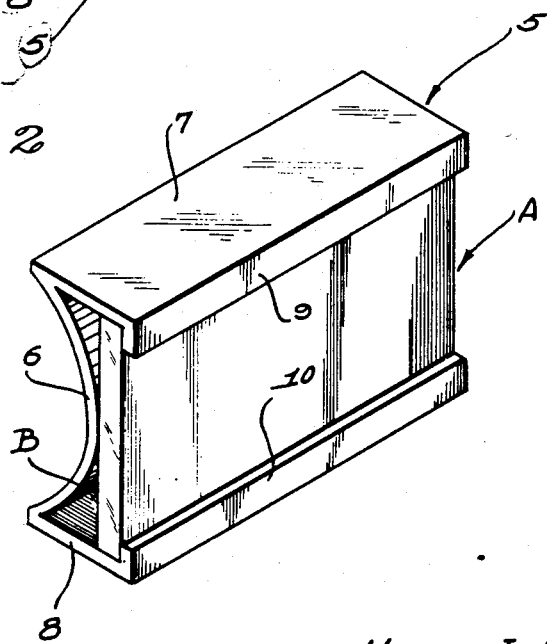
Inventor
WILLIAM L. HENDRICKS
By Clarence A. O'Brien
and Harvey B. Jacobson
Attorneys Patented May 31, 1949

2,471,524

UNITED STATES PATENT OFFICE 2,471,524

ANTIGLARE REARVIEW MIRROR ATTACHMENT

William L. Hendricks, Los Angeles, Calif.

Application April 23, 1946, Serial No. 664,219

1 Claim. (Cl. 88—77)

The present invention relates to rearview mirrors such as are employed on present-day automobiles and similar vehicles and conveyances and has more particular reference to a mirror attachment which is so designed and constructed as to act on and alter reflected images, this in a manner to minimize glare from headlights of the vehicles situated and approaching from the rear.

The ordinary rearview mirror, as is well-known, is substantially flat and approximately rectangular in form. The use of such a mirror, during night driving, is attended by objectionable hazards detrimental to safe and reliable car operation. With a view toward minimizing and diminishing glare I have devised a simple and effective glare interceptor and modifier. In its preferred embodiment, the device is in the form of an attachment capable of being readily attached to or detached from the regular flat mirror.

In carrying out my aims and ideas, I contemplate the provision of an elongated transversely curved anti-glare shield which is an auxiliary appliance and applicable, when wanted, to the flat mirror now commonly used.

Other objects, features and advantages of the invention will become more readily apparent from the following description and the accompanying illustrative drawings.

In the drawings, wherein like numerals are employed to designate like parts throughout the views:

Figure 1 is a perspective view of a conventional flat mirror and the auxiliary attachment, the latter constructed in accordance with the present invention and being shown in the position assumed when in use, and Figure 2 is also a perspective view observing the reverse side of the structure seen in Figure 1.

Referring now to the drawings by distinguishing reference numerals, it will be seen that the regular or standard mirror is denoted by the letter A and embodies the usual flat rearview reflecting surface B.

The safety or auxiliary appliance is denoted by the numeral 5 and, as before indicated, is characterized by a transversely curved elongated glare interceptor 6. The convex side rests against the main mirror surface B and the concaved side, the surface, is directed towards the driver and rear of the car, as is obvious. The interceptor 6 is proportioned to substantially cover or shield the surface B. Also, it is provided with flat angularly disposed top and bottom flanges 7 and 8 terminating in inturned retaining lips 9 and 10. Thus the attachment, as a unit, is somewhat in the nature of a split sleeve and can be slipped over the mirror A in an obvious manner. This makes it possible, if desired, to utilize the mirror A for ordinary day driving and to apply the attachment 5 for night driving.

In ordinary usage glare reflected in a rearview mirror is a detriment and hazard accompanying night driving, reflected light from headlights of following cars or other sources of illumination reflecting into the driver's eyes. As stated, the invention may be interpreted as an auxiliary nonglare device, the same being characterized by the anti-glare interceptor. The shape and curvature illustrated in the drawings is calculated, when in use, to substantially eliminate hazardous and confusing glare.

The essence of the invention is the concaved or curved member 6 with suitable means for attaching same to the mirror A. In practice, the attachment may be constructed from glass, plastic or equivalent transparent material. While the interceptor and modulator 6 is preferably of transparent glass it is not so essential that the flanges 7, 8, 9 and 10 be transparent. These can, if desired, be non-transparent.

The attachment 5, unitarily speaking, may be pressed or molded from a single piece of glass or from any suitable transparent plastic or equivalent composition; or it may be constructed from glass possessed of additional deflecting and refracting properties.

The attachment when in use constitutes a safety appliance for the regular mirror A using the surface B as a reflector and the curved surface 6 as an interceptor, the latter providing the desired deflecting and non-glare results. Thus, with the attachment applied thereto, the mirror A becomes an anti-glare device and safeguards the driver's eyes and virtually eliminates night driving hazards.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

In a rear-view mirror structure of the class described, an elongated transversely curved transparent member, the longitudinal edges thereof being provided with right angularly disposed flanges, said flanges being of a length commensurate with the length of the transparent member, said flanges being parallel to one another and the free longitudinal edge portions of the flanges being laterally directed toward each other to provide a pair of retention lips, said flanges projecting in a direction to reach points beyond the convexed surface of said member, and a flat reflecting mirror fitted between said flanges and held in place by said lips, the reflecting side of said mirror being in contact with the convex side of said member.

WILLIAM L. HENDRICKS.

REFERENCES CITED

The following references are of record in the file of this patent:

UNITED STATES PATENTS

| Number | Name | Date |
| --- | --- | --- |
| 1,348,712 | Gitterman | Aug. 3, 1920 |
| 1,910,503 | Schollmeyer | May 23, 1933 |
| 1,975,001 | Brown | Sept. 25, 1935 |
| 2,076,397 | Cady | Apr. 6, 1937 |
| 2,292,606 | Briggs | Aug. 11, 1942 |
| 2,327,802 | Kelly | Aug. 24, 1943 |